United States Patent [19]
DeBellis et al.

[11] Patent Number: 5,932,885
[45] Date of Patent: Aug. 3, 1999

[54] THERMOPHOTOVOLTAIC ELECTRIC GENERATOR

[75] Inventors: Crispin L. DeBellis; Mark V. Scotto, both of North Canton, Ohio; John D. Malloy, III, Goode, Va.; Stephen W. Scoles, Lynchburg, Va.; Donald L. Hindman, Forest, Va.; Jeffrey A. Rogers, Canton, Ohio

[73] Assignee: McDermott Technology, Inc., New Orleans, La.

[21] Appl. No.: 08/858,335

[22] Filed: May 19, 1997

[51] Int. Cl.[6] .................................................. F21H 5/00
[52] U.S. Cl. ...................... 250/493.1; 136/253; 431/115; 432/182
[58] Field of Search ..................... 250/493.1; 136/253; 431/115; 432/182

[56] References Cited

U.S. PATENT DOCUMENTS

| | | | |
|---|---|---|---|
| 4,584,426 | 4/1986 | Nelson | 136/253 |
| 4,707,560 | 11/1987 | Hottel et al. | 136/253 |
| 4,750,943 | 6/1988 | Nelson | 136/253 |
| 4,826,426 | 5/1989 | Nelson | 431/100 |
| 4,836,862 | 6/1989 | Pelka et al. | 136/253 |
| 4,877,553 | 10/1989 | Diederich | 252/492 |
| 4,976,606 | 12/1990 | Nelson | 431/79 |
| 5,066,339 | 11/1991 | Dehlsen | 136/253 |
| 5,092,767 | 3/1992 | Dehlsen | 432/181 |
| 5,137,583 | 8/1992 | Parent et al. | 136/253 |
| 5,312,521 | 5/1994 | Fraas et al. | 136/253 |
| 5,356,487 | 10/1994 | Goldstein et al. | 136/253 |
| 5,360,490 | 11/1994 | Nelson | 136/253 |
| 5,383,976 | 1/1995 | Fraas et al. | 136/253 |
| 5,439,532 | 8/1995 | Fraas | 136/253 |
| 5,512,108 | 4/1996 | Noreen | 136/253 |
| 5,512,109 | 4/1996 | Fraas et al. | 136/253 |
| 5,551,992 | 9/1996 | Fraas | 136/253 |
| 5,560,783 | 10/1996 | Hamlen | 136/253 |

OTHER PUBLICATIONS

Fraas, L.M. et al., "Fundamental Chracterization Studies of GaSb Solar Cells", The 22nd IEEE Photovoltaic Specialists Conference, IEEE, New York, NY, 1991, pp. 80–89.

Noreen, D.L., et al., "High Power Density ThermoPhotovoltaic Energy Conversion", The First NREL Conference on Thermophotovoltaic Generation of Electricity, Copper Mountain, CO, 1994, pp. 119–131.

Nelson, R.E., "Thermophotovoltaic Emitter Development", The First NREL Conference on Theremophotovoltaic Generation of Electricity, Copper Mountain, CO, 1994, pp. 80–95.

Holmquist, G.A., et al., "Laboratory Development TPV Generator," The Second NREL Conference on Thermophotovoltaic Generation of Electricity, Colorado Springs, CO, 1995, pp. 138–161.

Singh, S.S., "Design of a High Temperature Gas–Fired Heating System Utilizing Ceramics", Industrial Heating, Nov., 1988, pp. 18–20.

Pernisz, U.C., et al., "Silicon Carbide Emitter and Burner Elements for TPV Converter", The First NREL Conference on Thermophotovoltaic Generation of Electricity, Copper Mountain, CO, 1994, pp. 99–105.

Saraf, D.B., et al., "Design of TPV Generator with a Durable Selective Emitter and Spectrally Matched PV Cells", The Second NREL Conference on Thermophotovoltaic Generation of Electricity, Colorado Springs, CO, 1995, pp. 98–108.

Coutts, T.J., et al., "A Review of Recent Advances in Thermophotovoltaics", The 25th IEEE Conference, Washington, DC, May 1996. Entire paper.

(List continued on next page.)

*Primary Examiner*—Jack I. Berman
*Attorney, Agent, or Firm*—R. J. Edwards; Eric Marich

[57] ABSTRACT

A thermally integrated burner/emitter/recuperator (BER) for a thermophotovoltaic (TPV) electric generator achieves improved energy efficiency using either liquid or gaseous fuels. A mixed ceramic and metallic alloy heat exchanger, together with a high temperature emitter, achieves increased energy density in a compact and lightweight assembly.

20 Claims, 13 Drawing Sheets

OTHER PUBLICATIONS

Fraas, L.M. et al., "SiC IR Emitter Design for Thermophotovoltaic Generators", The Second NREL Conference on Thermophotovoltaic Generation of Electricity, Colorado Springs, CO, 1995, pp. 488–494.

Fraas, L.M. et al., "Development of a Small Air–Cooled Midnight Sun Thermophotovoltaic Electric Generator", The Second NREL Conference on Thermophotovoltaic Generation of Electricity, Colorado Springs, CO, 1995, pp. 128–133.

Menchen, W.R., "Development of a 0.1 kW Thermoelectric Power Generator for Military Applications", American Chemical Society, 1986, pp. 1361–1366.

Schroeder, K.L., et al., "An Experimental Investigation of Hybrid Kerosene Burner Configurations for TPV Applications", The First NREL Conference on Thermophotovoltaic Generation of Electricity, Copper Mountain, CO, 1994, pp. 106–118.

McAlonan, M., et al. "Burner System for a Thermoelectric Generator", American Institute of Aeronautics and Astronautics, Inc., 1987, pp. 1962–1968.

Vinton, B., "Ceramic Radiant Tube System Speeds Batch Furnace Recovery", Heat Treating, Feb. 1989, pp. 24–27.

THERMOPHOTOVOLTAIC ELECTRIC GENERATOR

FIELD OF THE INVENTION

The present invention relates generally to the field of thermophotovoltaic (TPV) power generation and, more particularly, to a thermally integrated burner/emitter/recuperator (BER) assembly for a TPV electric generator which is suitable for use with liquid or gaseous fuels.

BACKGROUND OF THE INVENTION

Photovoltaic (PV) cells are semi-conductor materials that generate an electric current when irradiated with an infra-red (IR) photon source. The required temperature of the PV cell's energy source, the emitter, must be high enough to emit significant radiation above the PV cell's characteristic bandgap energy. Photons energetic enough to induce the bandgap electron transitions in the PV material will generate an electric current. In general, the photon or radiant emission of a material increases with temperature. Therefore, higher emitter temperatures can substantially reduce the PV cell area required to generate a given level of power.

Solar photovoltaic technology utilizes relatively inexpensive Si cells in which the bandgap energy is 1.12 eV (1.11 microns). The sun is a high temperature source (6000° K.) with much of its radiant emission above this bandgap energy. A solar cell is typically capable of generating only about 0.02 Watts/cm$^2$ in direct sunlight. This is due to the sun's large distance from the earth which diminishes the useful energy flux. Therefore, solar photovoltaic power systems require relatively large solar panels to collect sufficient power for residential dwellings and are confined to locations and climates with sufficient sunlight. Reflective surfaces are often utilized in this technology to concentrate the sun's energy on the photovoltaic surface.

FIG. 1 illustrates a typical TPV system, generally designated 10. A fossil fuel 12 is combined with preheated combustion air 14 for combustion in a burner 18. Radiative and convective heat transfer 20 from the combustion process occurring at burner 18 elevates the temperature of an emitter 22. The emitter 22 then radiates energy 24 to photovoltaic (PV) cells 26 which convert incident radiant energy into electrical energy 28 in the form of a direct current or DC. However, because PV cells 26 cannot convert all wavelengths of light into electricity, optical filters 30 are used to filter out less useful wavelengths and permit desirable wavelengths 32 of radiant energy to strike the PV cells 26. This is important because that portion of the incident energy absorbed by the PV cells 26 which is not converted into electricity must be removed as waste heat 34. A recuperator 36 is used to boost the TPV system 10's efficiency by transferring a portion of the energy in hot combustion products 38 produced by burner 18 into incoming combustion air 14 to produce the preheated combustion air 16, and prior to exhaust 40 of the combustion products 38 into the atmosphere.

Development efforts on TPV technologies go back to the early 1960s. Recently renewed interest in TPV has occurred with the development of more efficient lower bandgap PV cell designs that can be coupled with lower temperature IR emitter sources. It is now in the realm of possibility to generate sufficiently high emitter temperatures with fossil fuel combustion, and to fabricate emitter materials that can withstand these temperatures. To use silicon cells efficiently would require emitter temperatures greater than 2000° K. This high temperature would result in rapid degradation and failure of the emitter and other high temperature components of the system. However, the recent development of low bandgap semiconductor materials allow the use of lower emitter temperatures. The gallium antimonide (GaSb) PV cells described by Fraas et al. in "Fundamental Characterization Studies of GaSb Solar Cells" (22nd IEEE Photovoltaic Specialists Conference, IEEE, New York, 1991, pp. 80–89) are sensitive in the IR radiation out to 1.8 μm (0.73 eV). See FIG. 2.

Currently, systems producing up to several kilowatts are under development. Commercial viability will be largely dependent on fabrication costs per unit of useable electrical power output. The low bandgap PV cells are expected to be the most costly component of the TPV electric generator. The quantity of PV cells can be minimized with the design of energy efficient systems, and with the development of emitter materials that can withstand higher temperatures to produce higher useful photon fluxes. According to Noreen and Du in "High Power Density Thermophotovoltaic Energy Conversion" (The First NREL Conference on Thermophotovoltaic Generation of Electricity, Copper Mountain, Colo., 1994, pp. 119–131), it was estimated that IR emitter sources need to produce a sufficient energy flux to generate approximately 7.5 to 10 Watts/cm$^2$ to be commercially viable given current PV cell technology. This would allow fabrication of compact, lightweight power systems which can produce significant power at reasonable costs. These are only some of the technical challenges that must be surmounted to make TPV technology a cost effective and energy efficient alternative. Potential applications for small portable power generators include: the military, commercial customers in remote areas without easy access to a utility grid, cogeneration for residential and commercial dwellings, and self-powered appliances.

Several R & D programs are under way to develop TPV power system components. Much effort has gone into fabricating durable, selective emitters that efficiently couple their radiance to the PV cell's bandgap energy. The tradeoff for higher energy efficiency utilizing selective emitters is lower useful photon fluxes (power density). Broadband (black body) emitters increase the photon convertible radiance on the emitter which necessitates less PV cell area for a given power output. This significantly reduces system cost. However, PV cell conversion efficiency suffers. Furthermore, out of band photon energy is also significantly higher with broadband emitters, and this radiant energy must be recycled back to the emitter with elaborate spectral filters and reflectors to maintain high system efficiency. The debate between broadband and selective emitters as a system choice continues. In the near term, and as discussed in the aforementioned Noreen and Du reference, some investigators feel that broadband emitters may be more appropriate for the larger scale TPV systems that approach a kilowatt. The higher power densities will be necessary to keep costs down by minimizing the number of PV cells.

Selective emitter materials tend to have low thermal conductivities and are susceptible to thermal stresses. For this reason much of the selective emitter development has taken the approach of fabricating fibrous porous emitters on which a fossil fuel flame is stabilized. This design approach provides excellent thermal coupling with the flame. As a result, emitter materials quickly approach the flame temperature despite the low thermal conductivity. Fibers can also bend and thus thermal stresses can be relieved. However, mechanical durability is poor. See for example, Nelson, "Thermophotovoltaic Emitter Development" (The First NREL Conference on Thermophotovoltaic Generation of Electricity, Copper Mountain, Colo., 1994, pp. 80–95) and Holmquist et al., "Laboratory Development TPV Generator" (The Second NREL Conference on Thermophotovoltaic Generation of Electricity, Colorado Springs, Colo., 1995, pp. 138–161) which describe development efforts for these selective emitters, and which include Supported Continuous Fiber Radiant Structures (SCFRS) in which a solid ceramic support structure is fabricated with an array of holes in which small fiber bundles are mounted with a ceramic epoxy. This design replaces a single large fibrous structure with several small fibrous bundles and improves strength. Other work includes flow through ceramic felts utilizing a replication process on a rayon felt mat. Both of these approaches use $Yb_2O_3$ as the selective emitter material, and seek to improve spectral properties and increase resistance to mechanical and thermal stresses. Both of these approaches require a transparent window between the emitter and the PV cells to isolate them from the high temperature products of combustion. This window must have high temperature capabilities and/or be cooled. The most economical choice for this material is quartz; however, with high emitter temperatures, quartz windows must be cooled which significantly complicates the system and reduces efficiency.

Another approach for the emitter uses solid monolithic or composite structures where the emitting surface forms a physical barrier between the PV cells and hot combustion gases. This approach usually utilizes a broadband emitter such as SiC. SiC ceramic tubes have undergone much development work as IR heat sources for industrial heating applications. See for example, Singh "Design of a High Temperature Gas-Fired Heating System Utilizing Ceramics" (Industrial Heating, November 1988, pp. 18–20) and Vinton "Ceramic Radiant Tube System Speeds Batch Furnace Recovery" (Heat Treating, February 1989, pp. 24–27). SiC ceramic tubes are excellent gray body emitters with emittance values close to 0.9 over a significant energy range including the IR. SiC also has a high thermal conductivity. Therefore, SiC ceramic tube emitters exhibit excellent thermal shock resistance, and the thermal resistance through the monolithic layer to the emitting surface is minimized. The maximum operating temperature of SiC is approximately 2000° K. As described in Pernisz, et al. "Silicon Carbide Emitter and Burner Elements for a TPV Converter" (The First NREL Conference on Thermophotovoltaic Generation of Electricity, Copper Mountain, Colo., 1994, pp. 99–105), some investigators are developing innovative approaches to the fabrication of SiC burner elements for TPV applications. Utilizing organic siloxanes as precursors, additional additives, and careful control over the pyrolysis step, these investigators have achieved considerable flexibility in the physical characteristics of SiC forms. With the ability to control density and porosity, and high emittance ($\geq 0.84$), SiC was deemed an excellent material candidate for broadband emitting burner elements.

Conceptual designs for systems utilizing broadband and selective emitters have been patented. See, for example, U.S. Pat. No. 4,836,862 to Pelka et al., drawn to a combustor/reactor for a TPV process employing recuperation of energy from the products of combustion.

In Saraf et al., "Design of a TPV Generator with a Durable Selective Emitter and Spectrally Matched PV Cells" (The Second NREL Conference on Thermophotovoltaic Generation of Electricity, Colorado Springs, Colo., 1995, pp. 98–108), a TPV generator design is proposed that operates at 1100° C. to generate 250 watts of useable electric power, A cylindrical emitter, 6 inches in diameter and 10 inches long, emits inward to a 2 inch cylinder that supports six (6) separate ½ inch wide InGaAs PV strips with a bandgap of 0.6 eV. Inside the cylindrical PV cell support, a porous metal heat exchanger utilizes water at one (1) liter per minute to cool the PV cells. Parabolic reflectors focus the emitter radiance on the PV cell strips. A selective holmia emitter that is of a durable thermal shock resistant design would be used, and electric power output densities of 1.5 to 1.75 $W/cm^2$ were anticipated.

Laboratory work has also been performed in the development of conceptual designs for TPV electric generators. As described above, Nelson has been leading work in the development of a gas fired system utilizing SCFRS. As published by Coutts et al. in "A Review of Recent Advances in Thermophotovoltaics" (The 25th IEEE Conference, Washington, D.C., May 1996), these designs have a useable radiance of 4 $W/cm^2$ for 160 $W/cm^2$ of fuel input, and that usable radiance values of even 6 $W/cm^2$ has been achieved.

As described by Holmquist et al., supra, a methane/oxygen fired TPV generator is being developed that produced 2.4 kW at a claimed efficiency of 4.5%. The design utilized a flow-through selective emitter fabricated from a ceramic oxide (ytterbia). The process utilized a replication process to form a selectively emitting felt which enclosed a horizontal cylindrical combustion chamber. The ceramic felt failed when flows rates exceeded 630 SCFH. Future design goals included improving the characteristics of the felt emitter to reduce pressure and temperature drop, evaluating long term strength and emittance, and optimizing the combustion and recuperation process to improve efficiency.

U.S. Pat. Nos. 5,383,976 and 5,439,532 to Fraas et al. disclose various gas-fired TPV electric generators employing SiC emitters. A variation on the SiC emitter tube design known as a "spine disc burner/emitter" is described by Fraas et al. in "SiC IR Emitter Design for Thermophotovoltaic Generators" (The Second NREL Conference on Thermophotovoltaic Generation of Electricity, Colorado Springs, Colo., 1995, pp. 488–494) which improves the conversion efficiency of chemical energy to emitter radiance. See also Fraas, et al. "Development of a Small Air-Cooled Midnight Sun Thermophotovoltaic Electric Generator" (The Second NREL Conference on Thermophotovoltaic Generation of Electricity, Colorado Springs, Colo., 1995, pp. 128–133), which describes a TPV system that generates a power output of 137 Watts.

Schroeder et al. in "An Experimental Investigation of Hybrid Kerosene Burner Configurations for TPV Applications" (The First NREL Conference on Thermophotovoltaic Generation of Electricity, Copper Mountain, Colo., 1994, pp. 106–118), describes laboratory investigations which coupled flow-through emitters to liquid fired burners. The method of atomization for this low fuel input burner (<1 kg/hr) utilized ultrasonics. As described by Menchen in "Development of a 0.1 kW Thermoelectric Power Generator for Military Applications" (American Chemical Society, 1986, pp. 1361–1366) and by McAlonan et al. in "Burner System for a Thermoelectric Generator" (American Institute of Aeronautics and Astronautics, Inc., 1987, pp. 1962–1968), this atomization approach was used earlier in the development of small portable thermoelectric power systems for the U.S. Army.

It is thus clear that further improvements in TPV energy conversion efficiency and energy power density are needed before TPV electric power generation can be brought out of the laboratory and put to practical, commercial use. The present invention provides improvements to the burner/emitter/recuperator aspects of TPV systems.

SUMMARY OF THE INVENTION

The present invention is drawn to various aspects of components useful in TPV electric generator apparatus. More particularly, a thermally integrated burner/emitter/recuperator (BER) is described for use in a TPV electric generator which achieves improved energy efficiency and which can utilize either liquid or gaseous fuels. The liquid fuels include but are not limited to DF-2 or JP-8 while the gaseous fuels include but are not limited to propane or natural gas. The thermally integrated BER achieves improved energy efficiency. A mixed ceramic and metallic alloy heat exchanger, together with a high temperature emitter, achieves increased energy density with low parasitic power drain resulting in a compact and lightweight assembly.

Accordingly, one aspect of the present invention is drawn to a thermally integrated burner/emitter/recuperator (BER) for a thermophotovoltaic (TPV) electric generator, comprising a radiant combustion chamber means having an inlet for admission of air and fuel and an outlet for exhaust of hot combustion products. A burner means provides air and fuel to the inlet of the radiant combustion chamber means for combustion therein. Counterflow recuperator means, located adjacent to the burner means, preheats the air with the hot combustion products exhausted from the radiant combustion chamber means. Parallel flow fuel vaporizer/recuperator means, located within the counterflow recuperator means, are provided for preheating and vaporizing the fuel with the preheated combustion air prior to providing same to the burner means. Finally, emitter means for radiating photons when heated by the radiant combustion chamber means and the hot combustion products are provided, the emitter means surrounding and cooperating with the radiant combustion chamber means and the counterflow recuperator means so as to convey the hot combustion products along a wall of the emitter to heat it as the hot combustion products are conveyed from the outlet of the radiant combustion chamber means to the counterflow recuperator means.

Another aspect of the present invention is drawn to a BER which is simple in design, rugged in construction, and economical to manufacture.

The various features of novelty which characterize the invention are pointed out with particularity in the claims annexed to and forming a part of this disclosure. For better understanding of the invention, its operating advantages and specific benefits attained by it uses, reference is made to the accompanying drawings and descriptive matter in which preferred embodiments of the invention are illustrated.

DESCRIPTION OF THE PREFERRED EMBODIMENTS

Figure 1:
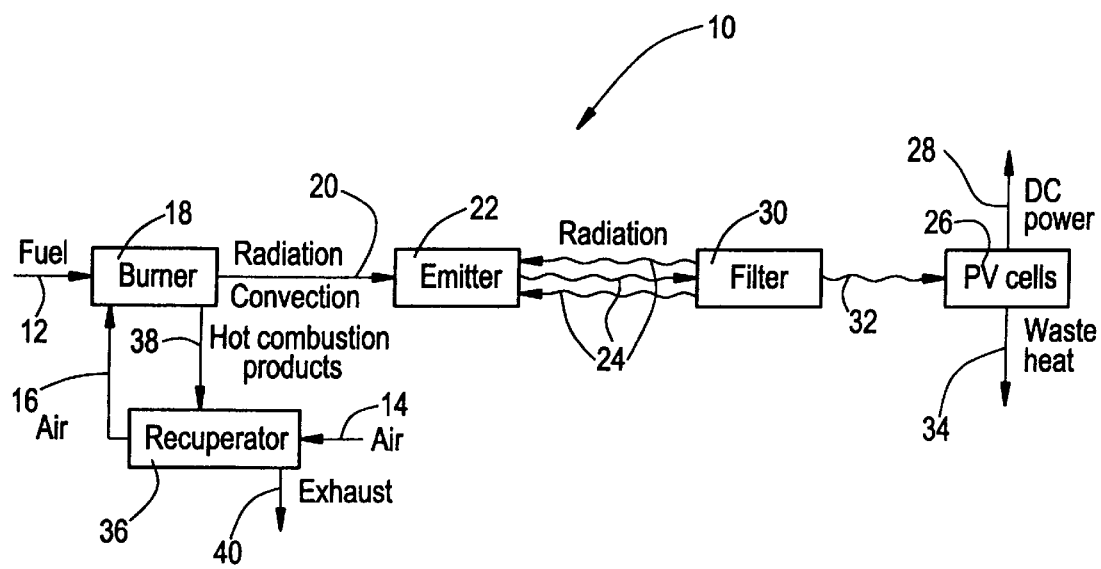
FIG. 1 is a schematic illustration of the components of a typical TPV system.
Figure 2:
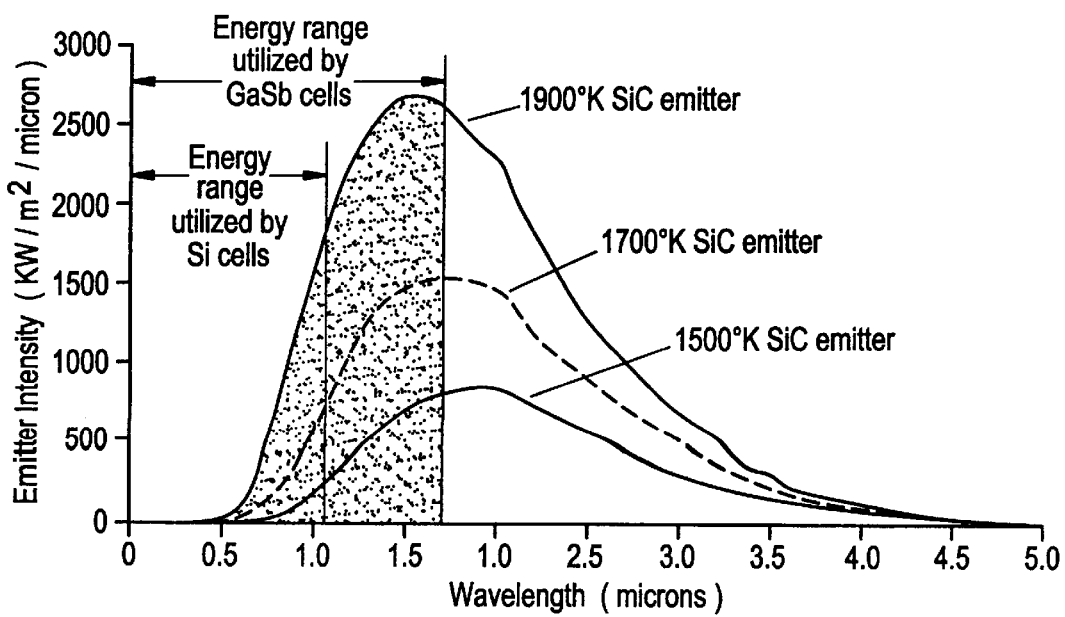
FIG. 2 is a graph illustrating the relative performance of silicon (Si) and gallium antimonide (GaSb) PV cells emitter intensity as a function of incident radiation wavelength.
Figure 3:
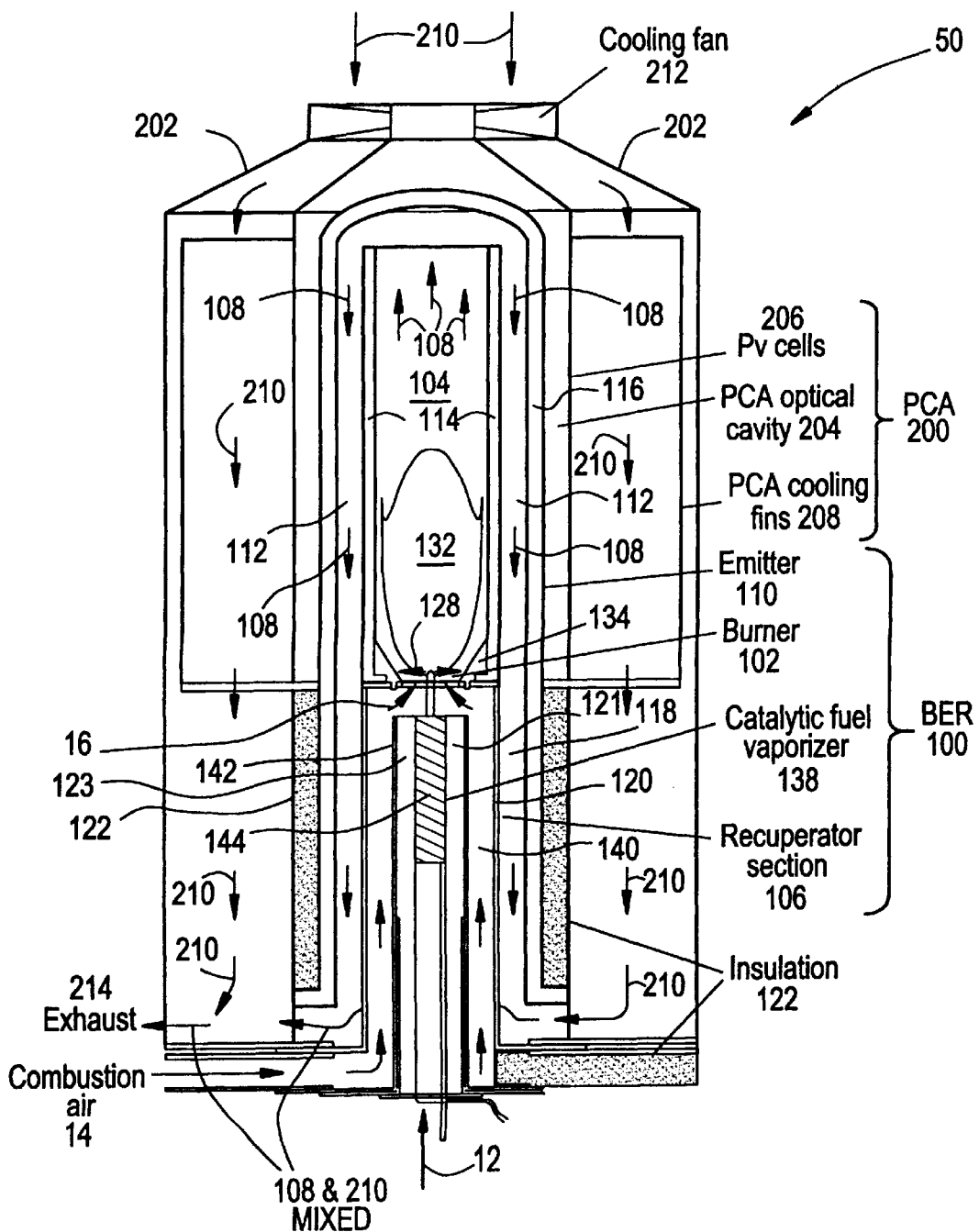
FIG. 3 is a schematic sectional view of a TPV electric generator employing the BER of the present invention.
Figure 4:
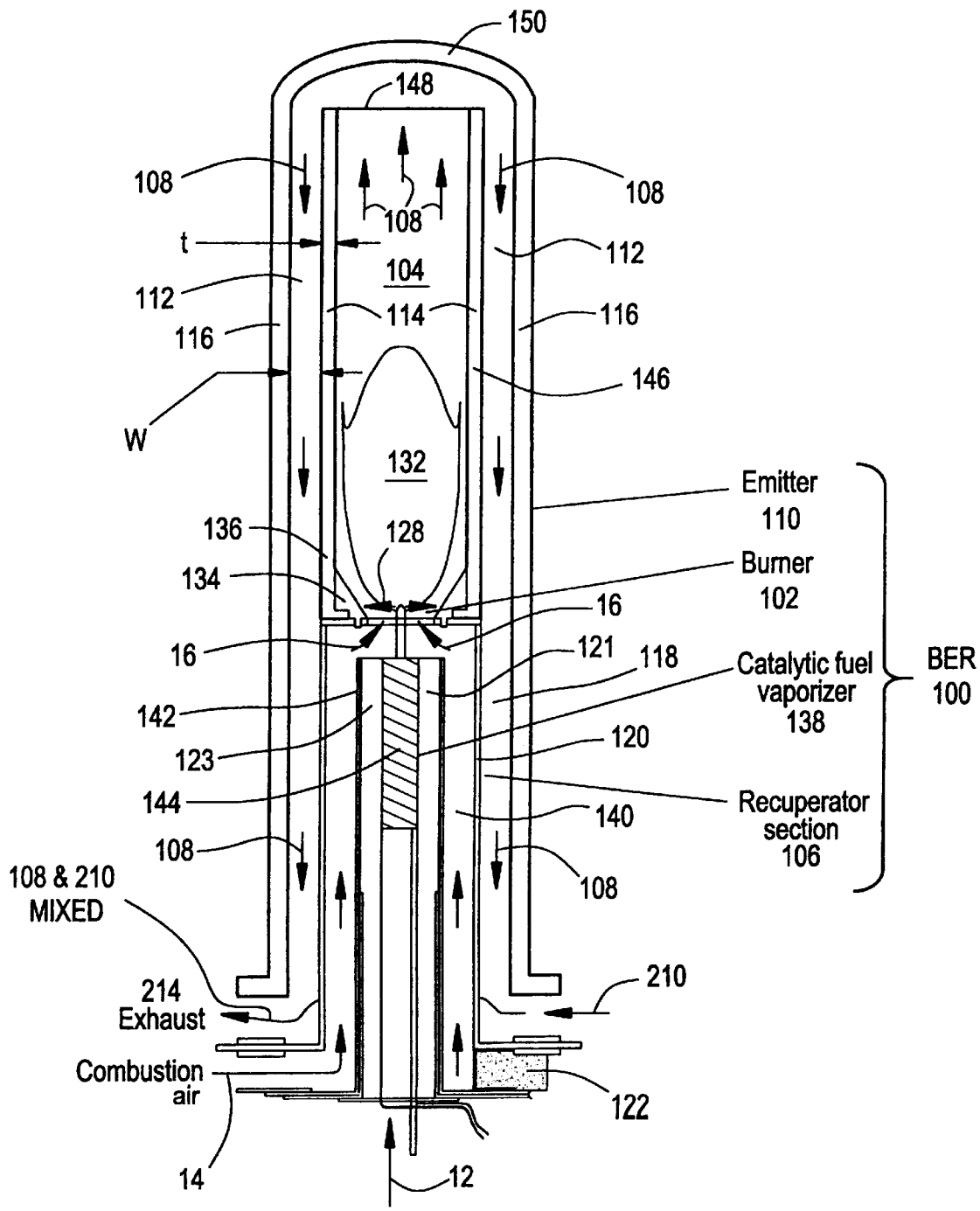
FIG. 4 is a schematic sectional view of the BER of FIG. 3.

Referring to the drawings generally, wherein like numerals designate the same or functionally similar elements throughout the several drawings, and to FIGS. 3 and 4 in particular, there is shown a thermophotovoltaic (TPV) electric generator, generally designated 50, which utilizes gaseous or liquid fossil fuels to generate electric power. The TPV generator 50 is comprised of two major subassemblies, a burner/emitter/recuperator (BER) assembly, generally designated 100 and hereafter referred to as BER 100, and a power converter assembly (PCA), generally designated 200. The BER 100 is substantially cylindrical and includes a burner 102 for combusting liquid or gaseous fuel 12 with preheated combustion air 16 in a radiant combustion chamber 104 located above the burner 102. A counterflow recuperator section 106 provided at a lower end of the BER 100 surrounds the burner 102 and associated components described infra uses hot combustion products (gases) 108 from the radiant combustion chamber 104 to preheat incoming combustion air 14 provided at a lower end of the BER 100. A parallel flow recuperator 121 provided inside of counterflow recuperator section 106 uses preheated combustion air 16 to vaporize liquid fuel 12 upstream of the burner 102. An emitter 110 surrounding both the burner 102 and radiant combustion chamber 104 is heated by the hot combustion gases 108 exiting from the radiant combustion chamber 104 to a specified temperature. The emitter 110 is impervious to gas flow through its walls. The hot combustion gases 108 flow through an annular passageway 112 created between a wall 114 of the radiant combustion chamber 104 and a wall 116 of the emitter 110 to accomplish this heating. The hot combustion gases 108 then proceed into a continuation 118 of the annular passageway 112, formed between a wall 120 of the recuperator section 106 and the wall 116 of the emitter 110. Air 14 for combustion flows up along one side of the wall 120 on the inside of the recuperator section 106 while the hot combustion gases 108 flow downwardly along the other side of the same wall 120. Heat transfer from the hot combustion gases 108 through the wall 120 preheats the incoming combustion air 14 on the opposite side of the wall 120. Likewise, preheated combustion air 16 passes through the parallel flow recuperator section 121 and transfers heat across wall 142 to vaporize incoming liquid fuel stream 12. Thus it will be seen that the radiant combustion chamber 104, the burner 102, the counterflow recuperator section 106, the parallel flow recuperator section 121, and the emitter 110 are substantially coaxial with one another. It will further be seen that air flows through the counterflow recuperator section 106 and the combustion products flow through the radiant combustion chamber 104 predominantly in a first direction, while hot combustion products counterflow along the wall 116 of the emitter 110 from the outlet of the radiant combustion chamber 104 to the counterflow recuperator section 106 predominantly in a second direction. Insulation 122 is provided at various locations around the recuperator section 106 to maximize the thermal efficiency.

Figure 15:
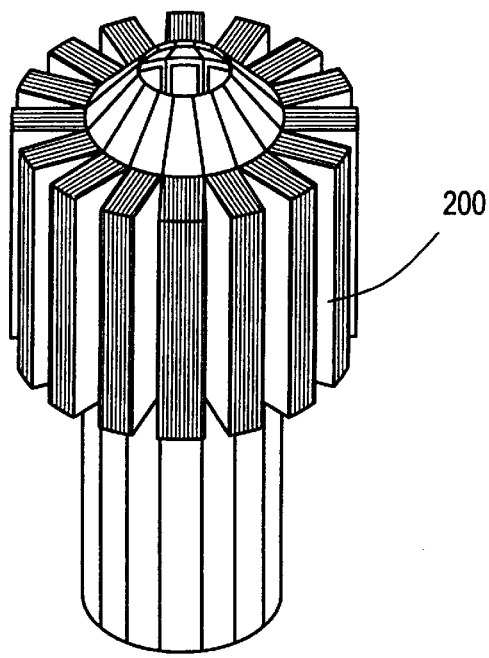
FIG. 15 is a schematic perspective illustration of a power converter assembly (PCA) useful in combination with the BER according to the present invention.
Figure 16:
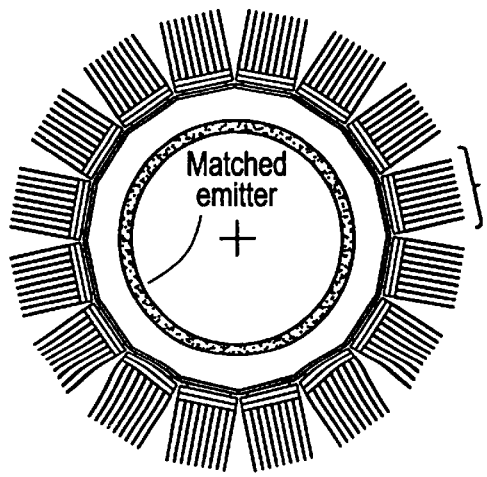
FIG. 16 is a plan view of the PCA of FIG. 15.

The PCA 200 is also substantially cylindrical and surrounds the BER 100, and is provided with an outer shell 202. The PCA 200 is spaced from the emitter 110 by a specified distance to create PCA optical cavity 204, generally defined by the emitter 110 and a surrounding array of PV cells 206. FIG. 15 illustrates the PCA 200 without the shell 202 for clarity purposes and FIG. 16 is a plan view thereof. In the PCA 200, the emitter 110 radiates preferentially in a given energy band to excite the PV cells 206 to generate electricity. To cool the PV cells 206, PCA cooling fins 208 are provided on each of the PV cells 206 and cooling air 210 is forced downwardly across these PCA cooling fins 208 by cooling fan means 212, preferably an axial flow fan. The cooling air 210 flows downwardly within the shell 202 across the fins 208 to a lower portion of the TPV generator 50. This cooling air is then mixed and blended with the hot combustion gases 108 exiting from the recuperator section 106 before both are exhausted to the atmosphere at 214. The combination of the insulation 122 surrounding the recuperator section 106, the cooling air 210 passing over the PCA cooling fins 208 and recuperator section 106, the shell 202 surrounding the BER 100 and PCA 200, and the mixing of the hot combustion gases 108 with the cooling air 210 prior to exhaust at 214, produces a quiet, thermally integrated and insulated TPV generator 50 with a low thermal signature. The power from the TPV generator 50 is utilized to operate electronic equipment (useable power), and to operate equipment necessary for system operation such as air fans, fuel pumps (not shown), and automated valves (also not shown) (parasitic power loss).

Figure 17:
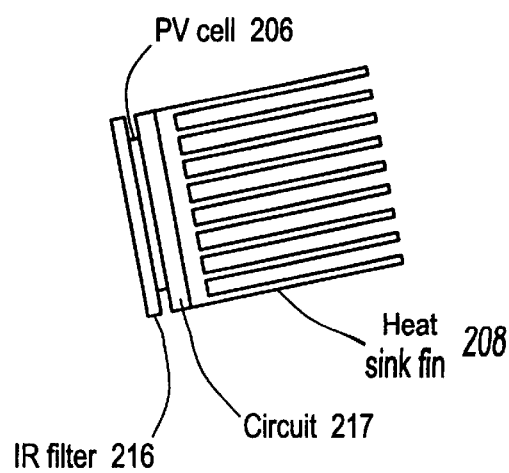
FIG. 17 is an enlarged, schematic view of a converter module used in the PCA of FIG. 16.

In the PCA 200, the emitter 110 radiates a portion of its energy in the IR (infrared radiation) region of the spectrum. The photons are absorbed by the PV cells 206. Those photons above the cell's characteristic bandgap energy in the IR can produce electricity with efficiencies up to approximately 30%. The remaining fraction of absorbed photons are converted to heat. Since the PV cell 206's electrical conversion efficiency is reduced at elevated temperature, the PV cell 206's support structure must be designed with a heat sink. In addition, the energy radiated by the emitter 110 below the PV cell 206's band gap energy cannot generate electricity. If this energy were absorbed it would also generate heat. Therefore, to maintain high efficiency, this energy must be recycled back to the emitter 110 using optical filters 216 (not shown in FIG. 3; see FIG. 17). In addition, reflective coatings (not shown) on some surfaces minimize waste heat loss and allow more low energy photons to be recycled back to the emitter 110. The PCA optical cavity 204 is thus more particularly defined by the emitter 110, optical filters 216, reflective coatings (not shown) and the PV cells 206 and their circuit components 217.

The required BER 100 emitter 110 surface area will depend on the optical efficiency of the PCA optical cavity 204, the PV cell 206 efficiency, and the targeted power output, and would thus be scaled to the capacity requirements of the system.

The BER 100 is designed to be as energy efficient as possible. The BER 100's energy efficiency is the fraction of fuel 12 energy utilized to heat the emitter 110 to its specified temperature. The counterflow recuperator 106 and parallel flow recuperator 121 are essential components for recovering energy that would otherwise be wasted when the combustion products 108 exit the system. The recuperator 106 is a heat exchanger that transfers this energy to the combustion air 14. The parallel flow recuperator 121 is a heat exchanger that transfers this energy to the fuel 12. By employing liquid fuel 12 in the BER 100 according to the present invention, additional opportunities for thermal efficiency improvement are thus available. This is because the liquid fuel 12 must be preheated and vaporized prior to combining it with preheated air 16 for combustion. The liquid fuel 12 thus represents an additional "heat sink" to which the heat in the hot combustion products 108 can be applied via the fuel vaporizer 138. More particularly, the parallel flow recuperator section 121 transfers heat from the preheated combustion air 16 to the fuel 12, and thus the overall thermal efficiency is improved. The exhaust 214 temperature is also lowered, further reducing the thermal signature of the device.

The means by which the burner 102's energy release is coupled to the emitter 110 is also critical in determining the BER 100's energy efficiency. A more rapid energy transfer mechanism between the hot combustion products 108 and the emitter 110 will reduce the amount of fuel 12 required to attain the specified average emitter temperature. The energy transfer to the emitter 110 must also address the need for temperature uniformity along the emitter 110.

The present BER 100 has the following capabilities or features: 1) a burner 102 with liquid and gas-fired capability; 2) reliable and stable flame ignition; 3) and rapid attainment of steady state conditions. The preferred BER 100 involves liquid fuel 12 firing, with gas fuel 12 firing as a simplified option. Rapid attainment of steady state conditions will reduce start-up energy requirements for liquid fuel 12 vaporization and operation of accessory equipment. The features necessary to achieve reliable and efficient fuel firing are presented below.

Fuel Vaporizer/Burner

Figure 5:
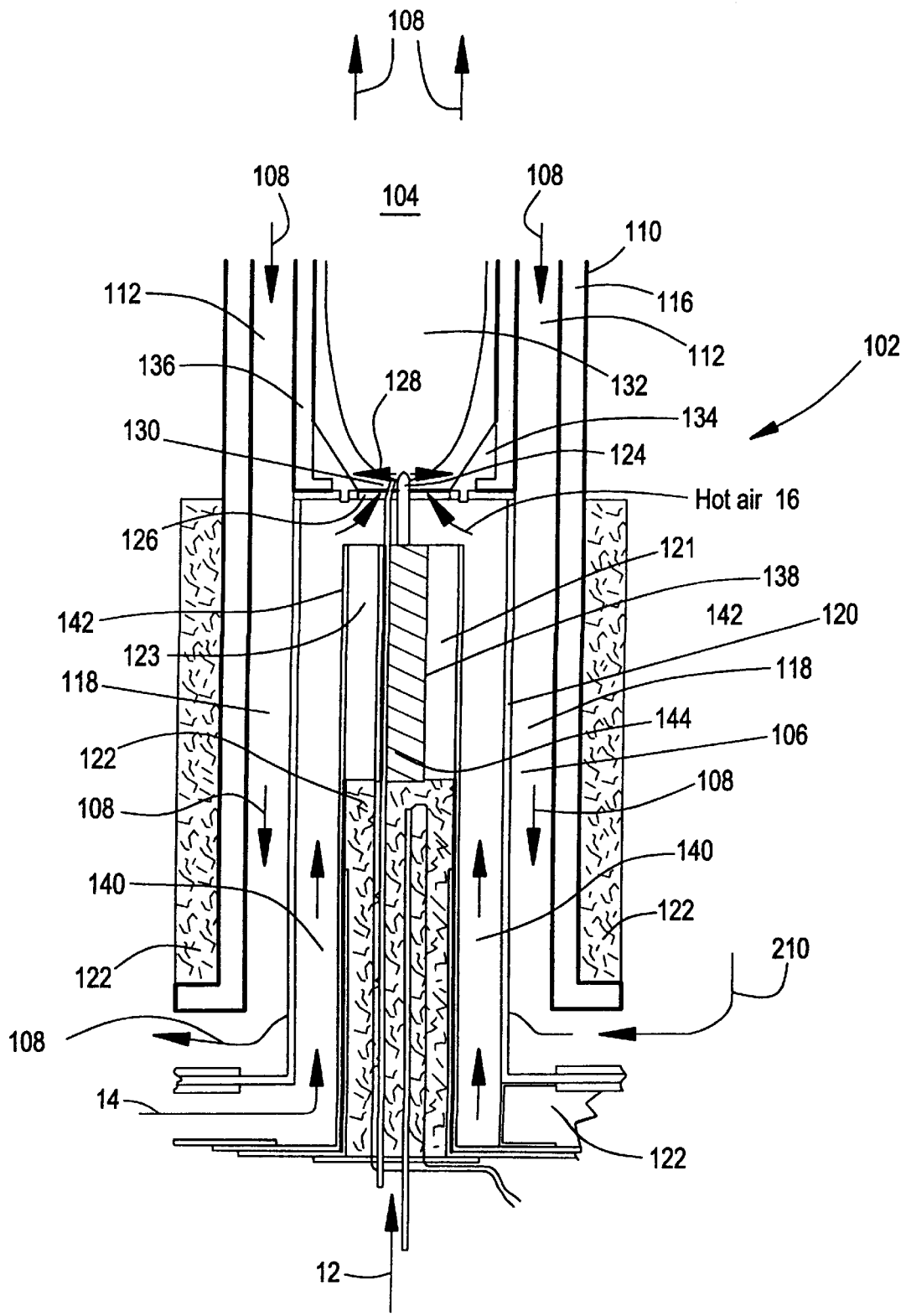
FIG. 5 is a schematic sectional view of a lower portion of the BER of FIGS. 3 and 4 illustrating a fuel vaporizer/burner according to the present invention.
Figure 6:
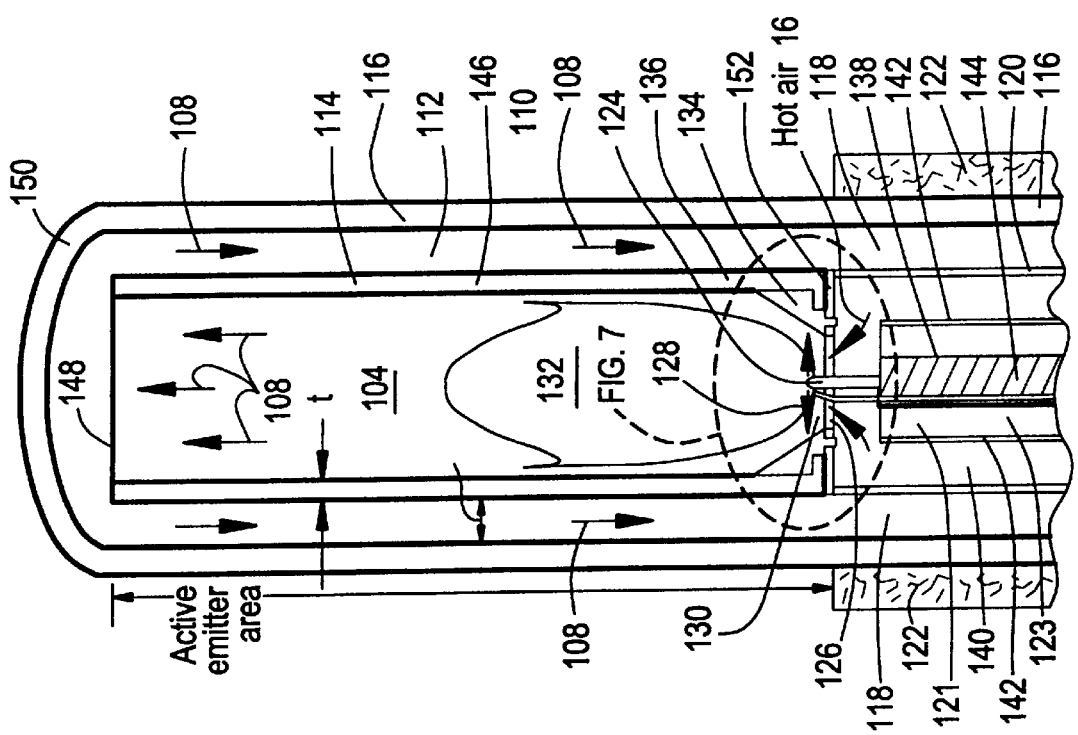
FIG. 6 is a schematic sectional view of an upper portion of the BER of FIGS. 3 and 4 illustrating a combustion chamber of the BER according to the present invention.

Referring now to FIGS. 5 and 6, the preferred embodiment of the burner 102 comprises a gas nozzle 124 which rapidly entrains the preheated combustion air 16 provided through an annular burner air opening 126. The gas nozzle 124 generates several fuel gas jets 128 that radially spread the fuel 12 into the radiant combustion chamber 104. The fuel jets 128 are ignited with a spark ignitor 130. In order to keep a resulting flame 132 in a lower portion of the radiant combustion chamber 104, the gaseous fuel jets 128 need to flow out from the gas nozzle 124 nearly perpendicular to the incoming annular air flow 16 around the gas nozzle 124. In addition, a refractory, frustoconical burner quarl throat 134 with a 15° to 45° angle, preferably 30°, from its center axis is required. The refractory burner quarl throat 134 is preferably a small piece of high density, high temperature refractory that will facilitate flame stabilization by providing a hot surface for flame attachment. The burner throat quarl 134 also protects a lower portion 136 of the wall 114 of the radiant combustion chamber 104 from direct flame 132 impingement. The quarl 134 controls the flame 132 expansion and swirl and prevents recirculation of hot flue gases to close to the burner 102 face. The fuel 12 is injected radially in order to get quick mixing with the air 16 and to hold the flame 132 low in the radiant combustion chamber 104. The gas nozzle 124 is designed to impart a tangential velocity component and a small axial velocity component to the fuel jet 128 velocity to prevent impingement on the burner throat quarl 134 that is too direct, and flame 132 stabilization that is too deep into the burner throat quarl 134. A combination of air 16 swirl, fuel jet 128 geometry, and refractory burner throat quarl 134 geometry will establish a well back mixed flame 132 stabilized near (but not too close to) the burner 102 face. These parameters can also be varied to position the flame 132 within the combustion chamber 104 to achieve a relatively uniform temperature profile along an active length of the emitter 110 to enhance TPV performance.

For liquid fuels, (i.e. DF-2 or JP-8) it is preferred that a catalytic fuel vaporizer 138 precede and vaporize the liquid fuel 12 provided to the gas nozzle 124. A crystalline aluminosilicate (zeolite) catalyst will be preferably utilized in the vaporizer heat exchanger 138 without added steam or air to break down the fuel 12 into lighter fractions. Lighter hydrocarbon fractions will burn more rapidly and cleanly in the radiant combustion chamber 104. Formation of lighter hydrocarbon fractions occurs via endothermic reactions that provide an additional heat sink for increased recuperation. Providing a significant fraction of hydrogen and unsaturated hydrocarbon gases gas will increase flame 132 velocities. Cracking catalysts are susceptible to gradual build-up of coke in the catalyst bed which may diminish catalyst activity over time. In addition, catalyst poisoning by sulphur containing compounds may occur. However, it is believed that there are commercially available zeolites which can process JP-8 and DF-2 for hundreds of hours without significant coking or poisoning of the catalyst bed.

The catalytic fuel vaporizer 138 will operate in the 500° K. to 600° K. temperature range. The heat exchanger/recuperator 106 surrounds the catalytic fuel vaporizer 138. Hot combustion air 16 flowing up through inner annular passageway 140 defined between an internal wall 142 and recuperator wall 120 recovers heat from the hot combustion exhaust 108. The hot air 16 heats the internal wall 142 defining the parallel flow recuperator section 121 of the heat exchanger/recuperator 106 which, in turn, will heat the catalytic fuel vaporizer 138 by conduction and/or radiative heat transfer during steady state operation. Inner wall 142 is positioned inside of the wall 120 separating the two annular passageways 118 and 140. The main liquid fuel 12 supply (not shown) will require a fuel pump (not shown) to deliver the liquid fuel 12 at moderate pressures (approximately 3 to approximately 10 psig) to the catalytic vaporizer 138.

During start-up for liquid fuel 12 combustion, some method of electrical heating will preferably be provided. The catalytic fuel vaporizer 138 could be heated with a surrounding nichrome wire electric resistance heater 144 or an internal cartridge heater. The heater 144 would initially be run off power provided by a battery (not shown) until hot heat exchanger surfaces in the recuperator 106 could take over. The primary advantage of electrical heating is that it is easily amenable to automation and precise control.

If the catalytic fuel vaporizer 138 were simply a tube or coil within which the fuel 12 boils, the generation of excessive heavy components might lead to a smokey flame and soot formation. Therefore, the preferred embodiment uses the catalytic fuel vaporizer 138. Preferably, the catalyst is located within element 138, but it could also fill an annular space 123 defined between wall 142 and element 138, in which case element 138 could readily be visualized as the aforementioned internal cartridge heater. The catalyst is intended to favor formation of lighter hydrocarbon fractions from the liquid fuel 12 and minimize the potential for excessive soot formation and decreased combustion efficiency in the radiant combustion chamber 104. The light hydrocarbon fractions formed by endothermic reactions provide an additional heat sink to improve recuperative energy recovery. The gas nozzle 124 at the downstream end of the vaporizer 138 is preferably made of ceramic and designed to operate at moderate pressures (approximately 3 to approximately 10 psig) to generate gaseous the fuel jets 128 predominantly comprised of light hydrocarbon fractions. The resulting flame 132 will not form deposits on internal surfaces of the radiant combustion chamber 104. However, it may be determined that non-catalytic fuel vaporization may be necessary if catalyst deactivation and bed plugging by coke formation within the bed becomes too rapid. Thus the present invention contemplates that the fuel vaporizer 138 could also be a simple thermal fuel vaporization device 138 that does not use a catalyst. Particular features of the radiant combustion chamber 104 are described below.

Combustion Chamber

Figure 7:
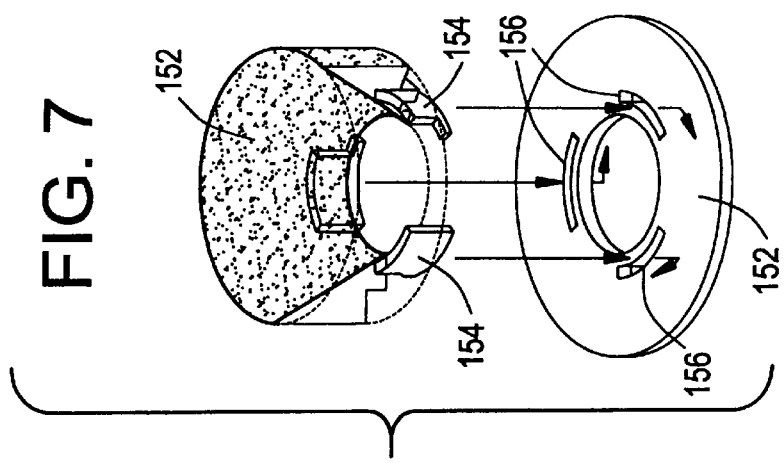
FIG. 7 is an enlarged schematic perspective view, partly in section, of a portion of the BER combustion chamber of FIG. 6.

Referring to FIGS. 6 and 7, the radiant combustion chamber 104 illustrated contains the flame 132 and transfers fuel energy to the emitter 110 to raise it to a specified temperature. Extracting as much chemical energy as possible from the fuel 12 to heat the emitter 110 surface is the objective of the burner 102 and the radiant combustion chamber 104. However, achieving temperature uniformity over the emitter 110, and observing material temperature limitations are also very important design criteria. The preferred embodiment of the radiant combustion chamber 104 comprises two co-annular tubes. Combustion occurs within an inner combustion tube or radiator 146, having an upper open end 148. Tube 146 is also surrounded or enclosed within an outer tube which comprises the emitter 110 itself. An upper end 150 of the emitter 110 tube is closed off so that the hot combustion products 108 flow out and around the upper open end 148 of the inner tube 146, and subsequently pass down the annulus 112 between the inner tube 146 and the emitter 110. This closed end 150 design makes it possible to secure the emitter 110 at the lower, cold end. Cold end attachment eliminates the need for high temperature joints and allows the emitter 110 tube to expand freely, thus lowering thermal stress and increasing reliability. The inner tube 146 is heated by the combustion gases 108 and radiates energy to the surrounding emitter 110. The emitter 110 is also heated by convection from the combustion gases 108 flowing through the annulus 112. The hot flame 132 in the lower portion of the inner tube 146 forming radiant combustion chamber 104 causes that portion to radiate more intensely to the emitter 110. In turn, the hot combustion gases 108 flowing in the annulus 112 are cooler at this point producing less convective heat transfer to the emitter 110, while the opposite effect happens at the upper end of the radiant combustion chamber 104. Through this design, the convective and radiation components of the heat flux to the emitter 110 can be offset to achieve a uniform heat flux applied to the emitter 110. This in turn will produce a uniform emitter temperature. Additional heat flux control to the emitter 110 can be achieved by varying the thickness t of the radiator wall 114 and the width w of the annulus 112. Also, the thermal resistance of the radiator 146 can be varied through the use of composite layers of low and high thermal conductivity materials. Proper selection of the values of these design parameters, will again result in a relatively uniform temperature profile along an active length of the emitter 110 to enhance TPV performance.

The preferred material for the combustion chamber tube or radiator 146 and emitter 110 will be a dense silicon carbide (SiC) for the following reasons. Several advanced SiC based ceramics are commercially available. They can be fabricated into a variety of shapes, and display superior properties. Very dense, hard mechanically durable combustion chamber parts can be fabricated with working temperatures as high as 2000° K. SiC also has a high thermal conductivity relative to other ceramic materials. This lowers the steady state operating temperature of the emitter 110 and radiator 146. In addition, lower combustion gas temperatures are necessary and less fuel 12 is required to drive the required energy transport through the emitter. Relative to other possible choices for ceramic materials, SiC also has a high thermal shock resistance making this material much less susceptible to breakage during use. The high density materials also have relatively good mechanical shock resistance. Emissivity is approximately 0.9 over a wide range of useful wavelengths making SiC an excellent broadband emitter. For these reasons, the broadband emitter approach of a SiC emitter 110 is preferred. However, alternatives are presented and discussed below which utilize selective emitter materials.

FIG. 7 illustrates a particular construction of the combustion tube 146, burner quarl 134, and the recuperator 106 which facilitates their assembly. The inner tube 146 is fastened and sealed to an upper recuperator plate 152 using the refractory burner quarl throat 134 at the base of the radiant combustion chamber 104. The burner quarl throat 134 is designed to attach the inner radiator tube 146 to the top of the recuperator plate 152 by means of embedded high temperature resistant, metallic, "L-shaped" pins 154 that can be inserted through slots 156 in the upper recuperator plate 152. A soft refractory layer (not shown) placed between the burner quarl 134 and the upper recuperator plate 152 would be provided for sealing. The pins 154 are fitted through the slots 156 and the burner throat quarl 134 compresses the soft insulating layer (not shown). Twisting the burner throat quarl 134 locks the L-shaped pins under the upper recuperator plate to hold the assembly in place.

The radiant combustion chamber 104 isolates the PV cells 206 from the hot combustion products 108. This eliminates the need for a window as required in a porous burner design. Thus, the over all system according to the present invention is simpler and cooling requirements are lower because there is no quartz window to cool. The lower cooling requirements will also result in a more efficient system with lower parasitic power for cooling fans and direct use of the energy absorbed off the window.

The placement of the burner throat quarl 134 relative to the active emitter area (illustrated in FIG. 6) is also crucial. The active emitter area should start at a level above the bottom of the burner throat quarl 134. If the active emitter area is below this level, significant amounts of thermal energy can radiate out of the radiant combustion chamber 104 directly into the recuperator 106. This energy "short circuit" can significantly lower system thermal efficiency.

Heat Exchanger (Recuperator)

Figure 8:
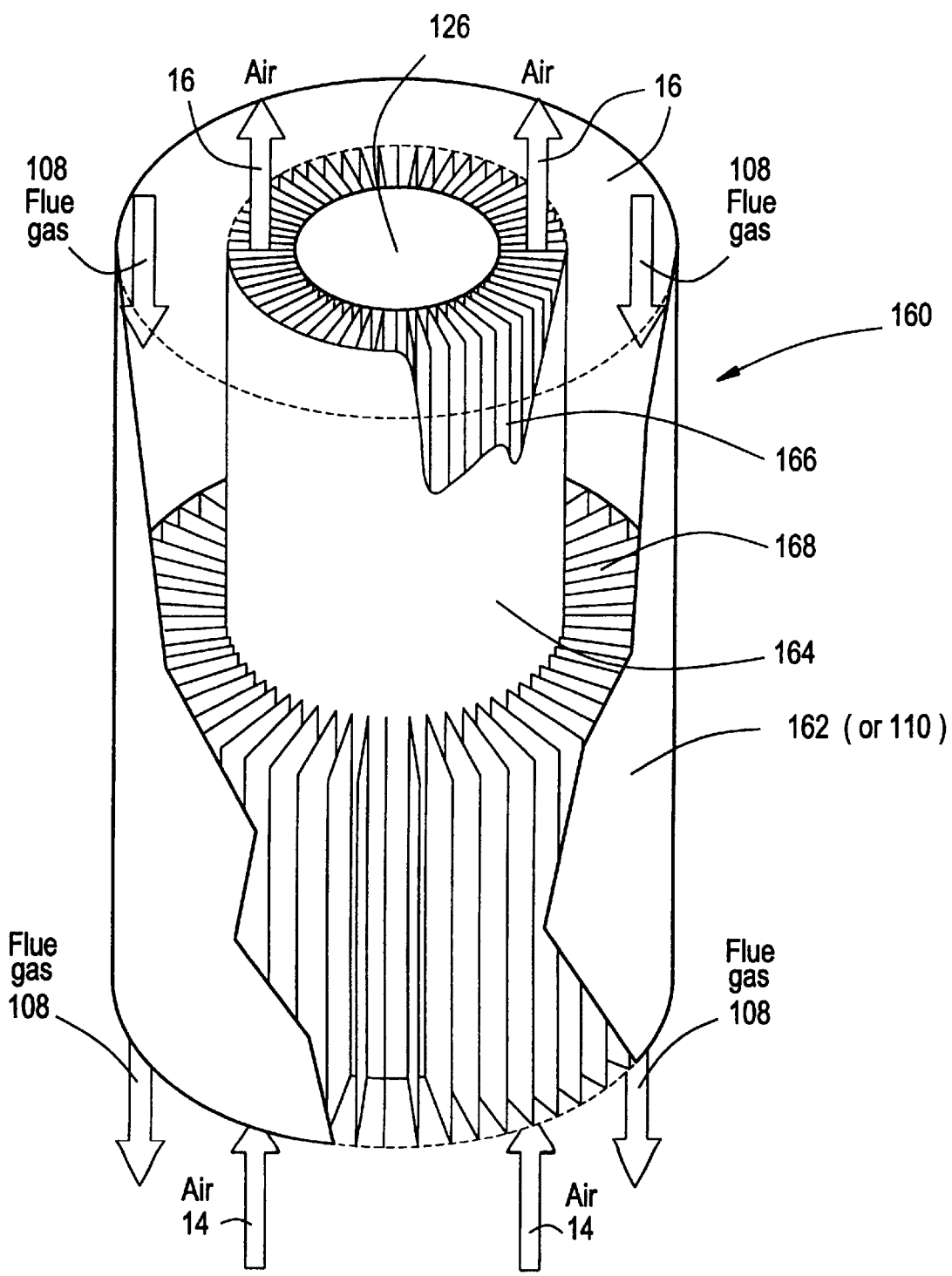
FIG. 8 is a schematic perspective view, partly in section, of a heat exchanger/recuperator used in the BER according to the present invention.

Ideally, ceramic materials which can withstand the high combustion gas temperature would be used in the heat exchanger/recuperator 106. However, reliable (long life) compact ceramic heat exchangers may not be available in the near-term. The present invention thus employs ceramics where they are needed (for the combustor chamber 104 and the emitter 110) and proven metallic structures for the majority of the recuperator section 106. Accordingly, FIG. 8 shows one embodiment of the recuperator system 106 of the present invention. The recuperator section 106 preferably comprises a high-temperature, metallic alloy, compact (plate-fin) heat exchanger, generally designated 160, located within an outer tube 162 advantageously made of ceramic, possibly SiC. Outer tube 162 could be merely a continuation of the emitter 110 itself. Inner tube 164 would preferably be a high temperature alloy because it will be cooled from the combustion air 14, 16 flowing on the inside. The fins 168 on the air side would be metallic and be attached to the inner tube 164. The fins 168 on the flue gas side would also be metallic and attached to the inner tube 164. The fins 168 on the flue gas side would start at a location when the temperature of the flue gas 108 falls below the maximum metal temperature. Thus in this embodiment, the counterflow recuperator section 106 comprises a compact plate fin heat exchanger having the inner tube 164 finned on both its inside and outside surfaces, air 14 flowing in a first direction along the inside surface of the inner tube 164 and hot combustion products 108 counterflowing along the outside surface of the inner tube 164 in a second direction. If a material like Kanthal® (a high temperature alloy comprised of chromium 22%, aluminum 4–6% and the balance, iron) is used for the inner tube 164 and fins 166, the maximum use temperature would be 1670° K. If Inconel were used, this temperature drops to 1300° K. The fins 166, 168 would be connected to the inner tube 164 with high temperature braze or welding.

Figure 14:
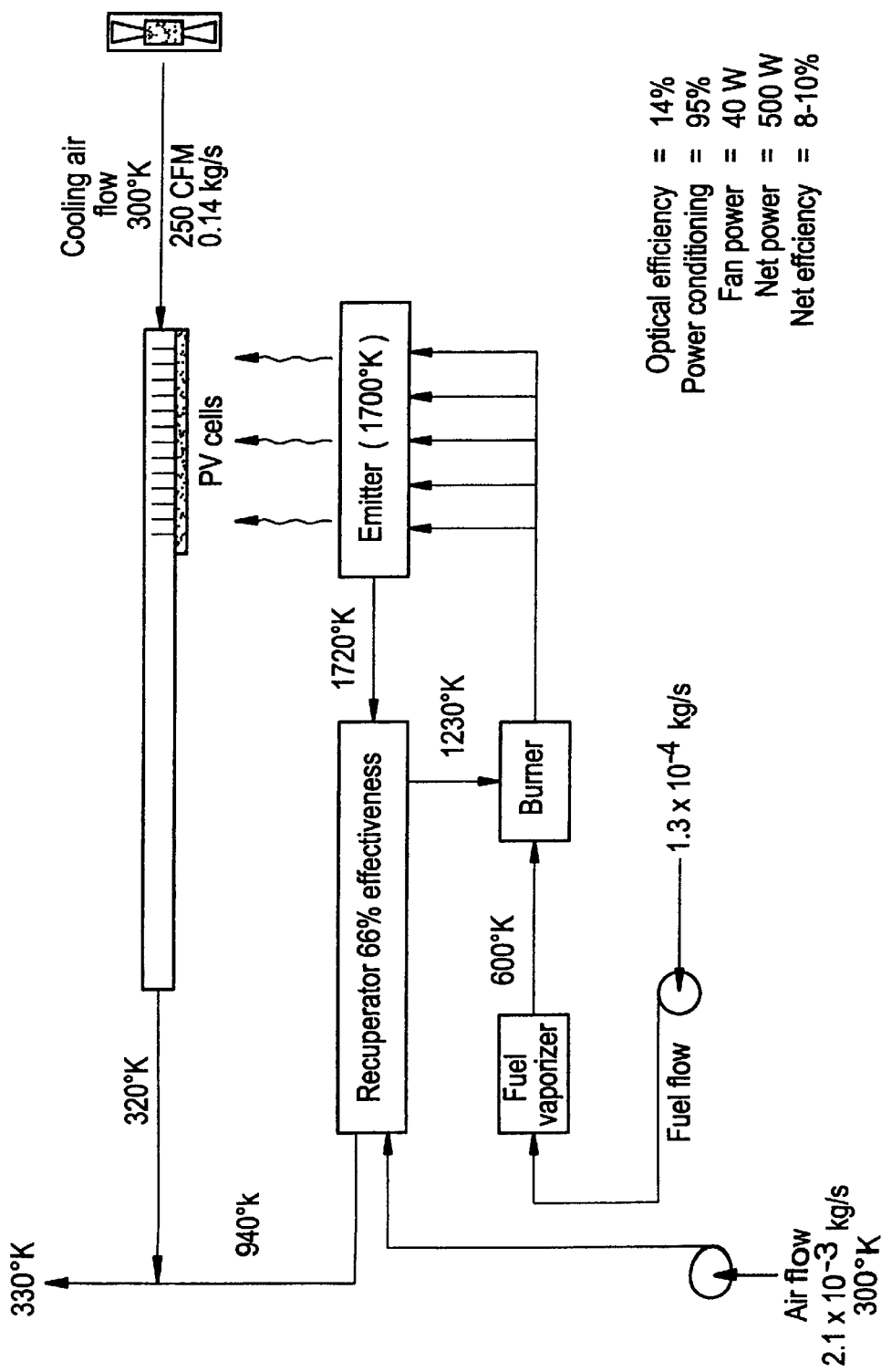
FIG. 14 is a schematic block diagram illustration of the performance of a TPV system employing the BER of the present invention.

To obtain a high efficiency TPV generator 50, a recuperator with a thermal effectiveness of 66% is required, achieving a preheat air temperature of 1200° K. The theoretical performance of such a system is schematically represented by FIG. 14. For a 500 watt, 24 volt DC TPV generator 50, using JP-8 fuel, it is envisioned that the entire TPV generator 50 incorporating the BER 100 according to the present invention will be approximately 20 cm (8 in.) in diameter and 50 cm (20 in.) high, not including any fuel tank or controls. It is estimated that the total system may weigh as little as 7.5 kg (16.5 lb.) without fuel. This clearly illustrates the compact and lightweight design for a TPV electric generator 50 which can be obtained using the features of the present invention. The recuperator must be compact and have a low pressure loss. A simple cylindrical recuperator with no fins, by itself, cannot produce this effectiveness regardless of length. The recuperator 106 and the burner/emitter 102/110 according to the present invention are thus close coupled and thermally integrated to improve overall system efficiency by lowering thermal losses. This close coupling also simplifies gas passages and sealing. In addition, the recuperator 106 length can be varied to either increase efficiency or reduce weight. This design option will trade off system efficiency for weight in a compact, low pressure drop design.

Advantages of the Invention

A thermally integrated BER of the present invention can be used to produce an energy efficient, compact, lightweight TPV power generator. High energy efficiency minimizes fuel usage for a given level of power output. High efficiency is preferably achieved by:

1) a lightweight, compact, high temperature ceramic and/or metallic heat exchanger/recuperator 106, integrated with a parallel flow heat exchanger/recuperator 121;
2) a radiant combustion chamber 104 and burner 102 design which effectively utilizes fuel energy to uniformly heat the emitter 110 to its operating temperature; and
3) a catalytic fuel vaporizer 138 that increases recuperated system heat and combustion intensity.

The SiC radiant combustion chamber 104 and (broadband) emitter 110 of the present invention provides many advantages. Material durability and life expectancy will be greatly improved. The emitter 110 forms an impervious physical barrier between the hot combustion gases 108 and the PV cells 206 which provides good shielding from excessive heat without a quartz window and additional cooling for such a window. The emitter 110 tube is also closed at the upper, hot end so that it can be secured at the cold end only. The primary radiant combustion chamber 104 design is simple and provides means to produce a uniform emitter temperature. Use of solid materials allows operation at higher emitter temperatures due to higher material durability. Higher temperature increases the emitted energy density and decreases required PV cell 206 area, weight, and cost for a given level of power production. The relatively high thermal conductivity of SiC improves energy transfer (fuel efficiency) from the radiant combustion chamber 104 through the emitter 110, lowers the working temperature of internal combustion chamber surfaces, and provides good resistance to thermal stress. Although material issues may prevent the use of flow-through combustion chamber components, options are provided for their use and discussed below to potentially improve fuel efficiency. Monolithic ceramics such as SiC are commercially available in cylindrical geometry. Although not unique to this invention, this geometry improves the view factor between the emitter 110 and the PV cells 206, thereby minimizing end losses. The cylindrical geometry also provides an efficient means for the PV cells 206 to dissipate heat outward through their support structure and PCA cooling fins 208. The cylindrical design also simplifies the flow passages and improves the close coupling of the BER 100.

The invention includes a burner design capable of burning a liquid fuel. Liquid fuel fired capability increases the attractiveness and potential application of the technology. The advantages of the disclosed burner design allow for reliable ignition, rapid start-up, stable operation, and clean, complete combustion of a liquid fuel. During startup, the primary design option initially utilizes battery power for fuel vaporization by electric resistance heating. This design is more conducive to automated control.

Thermal pre-vaporization of the liquid fuel provides an attractive alternative to ultrasonic atomization, because piezoelectric crystals utilized in such nozzles cannot exceed approximately 350° K. Therefore, extreme care must be taken to thermally shield such nozzles from a near adiabatic combustion environment. In addition, such nozzles are expensive. Additional advantages of pre-vaporization come from the fact that combustion can occur as a turbulent gaseous diffusion flame. This is more conducive to rapid mixing, higher combustion intensity, flame ignition and stability relative to a liquid atomized flame. Complete combustion will be possible with a more compact combustion chamber design. The potential for soot formation and coking on combustion chamber surfaces will be diminished. In addition, the use of a zeolite catalyst in the pre-vaporization chamber will generate lighter hydrocarbon fractions which diminish the potential for soot formation. Light hydrocarbon fractions formed by endothermic reactions provide an additional heat sink to recuperate energy from combustion products. The added system volume required for the pre-vaporization chamber will be neatly incorporated within the recuperator 106 which also provides the primary heat source for fuel vaporization at steady state conditions.

The advantages of the burner design are achievement of rapid ignition, flame stability, and rapid mixing utilizing:
1) a frustoconical refractory burner throat quarl 134;
2) combustion air swirl; and
3) multiple gaseous fuel jets 128 at moderate pressure (approximately 3 to approximately 10 psig) primarily radially injected into the radiant combustion chamber 104 but also with tangential and small axial velocity components to the fuel jet 128 velocity.

The radiant combustion chamber 104 is designed with a frustoconical refractory burner throat quarl 134 to shield the radiant combustion chamber 104 internals from direct flame impingement, and also acts as a fastening device for subsystem components. The burner throat quarl 134 when properly aligned with the emitter 110, prevents the short circuit of energy out the recuperator 106. The quarl 134 depth helps control the intensity of back mixing near the burner 102 face. The walls 114 of the combustion chamber 104 and the flame profile are designed to provide a uniform heat flux to the emitter 110 and thus produce a uniform emitter temperature along its active length. The radiator 146 shape, thickness t, and the annular gap w between it and the emitter 110 can also be varied to promote temperature uniformity.

The recuperator 106 design utilizes a combination of ceramic and metallic materials in a unique high temperature, high efficiency design that is superior to an annular design and can be built with conventional materials. The recuperator 106 is compact and has a low pressure loss. The recuperator 106 and the burner/emitter 102/110 are close coupled and thermally integrated to improve overall system efficiency by lowering thermal losses. This close coupling also simplifies gas passages and sealing. In addition, the recuperator length can be varied to either increase efficiency or reduce weight.

While specific embodiments of the invention have been shown and described in detail to illustrate the application of the principles of the invention, those skilled in the art will appreciate that changes may be made in the form of the invention covered by the following claims without departing from such principles. For example, as set forth immediately below, various changes in the form and construction of the burner, combustion chamber, and heat exchanger/recuperator used in the present invention may be employed in certain situations.

Burner Options

Figure 9:
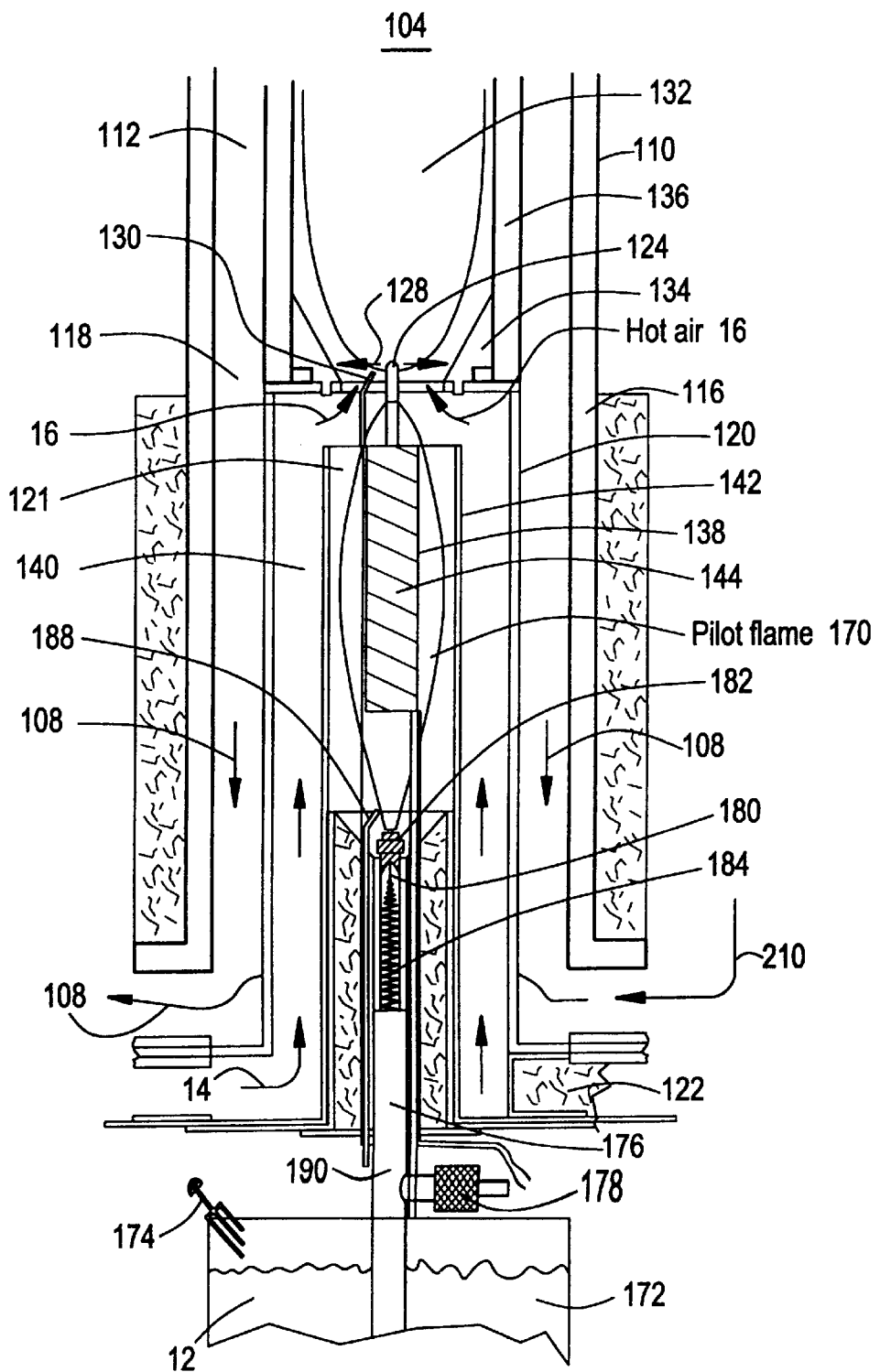
FIG. 9 is a schematic sectional view of an alternative embodiment of a liquid fueled burner used in the BER according to the present invention.

As illustrated in FIG. 9, a liquid fuel 12 fired pilot flame 170 can be utilized to preheat the catalytic vaporizer 138 until the heat exchanger/recuperator 106 provides this energy source at steady state operation. Although still shown in FIG. 9, this would allow one to replace the catalytic vaporizer 138's heating element 144, significantly reducing start-up requirements. Both constructions, however, could be provided to provide redundancy and availability. The pilot flame 170 would be started manually. Fuel flow would be supplied from a fuel tank 172 pressurized with a hand-operated pump 174. Therefore, a smaller lightweight start-up battery (not shown) could be utilized with this setup. This burner alternative will utilize a commercially available components to produce the pilot flame 170.

For the pilot flame, a fuel control assembly developed for Coleman® lanterns and stoves could be utilized. This type of fuel control assembly 176 allows for the combustion of liquid type fuels from a cold start by utilizing pressurized air which becomes entrained with the liquid fuel. A potentially useful fuel control assembly 176 is described in U.S. Pat. No. 4,522,582. As disclosed therein, a control knob 178 on the assembly opens a valve to initiate fuel flow to an outlet fuel orifice. Turning the control knob 178 through a sequence of positions slides a tip cleaning needle 180 into the fuel outlet orifice 182. Additional rotation partially opens a fuel inlet valve 184 allowing entrainment of air into the fuel. This action also gradually withdraws the needle 180 acting as a flow restricting device from the fuel outlet orifice 182. Eventually knob 178 rotation fully opens the fuel inlet valve 184 so that air is no longer aspirated into the line. At this point the fuel outlet cleaning/flow control needle is fully withdrawn from the outlet fuel orifice 182. As the pilot flame 170 heats a generator tube 186, operation without air aspiration is eventually allowed to occur when the fuel is vaporized prior to the fuel outlet orifice 182.

One or more fuel control assemblies 176 of the appropriate size would be utilized to heat the catalytic primary fuel vaporization chamber. During the startup of the TPV generator 50 when a source of heat is not available, the fuel/air mixture will flow from the burner nozzle 102 where it will be ignited by a spark ignitor 188. The flamelet(s) generated by the fuel control assembly(ies) will encompass the fuel vaporizer 138 which is integral to a main fuel supply line 190 that originates at the bottom of the fuel tank 172. This line will not entrain air. Air pressure could initially be generated in the fuel tank with the small hand operated plunger 174 to generate pressures on the order of 20–30 psig for proper operation of the fuel control assembly(ies) 176.

Figure 10:
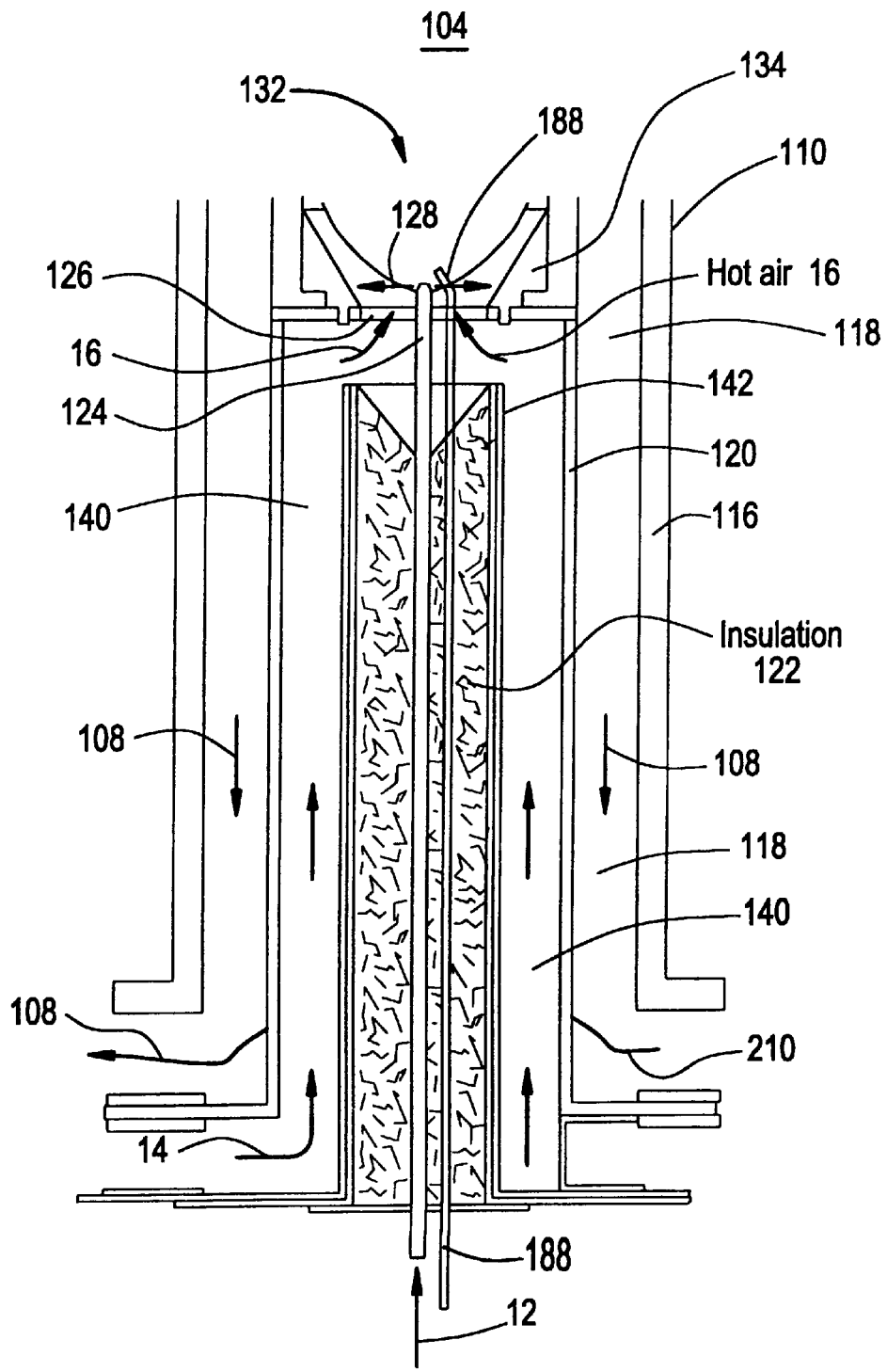
FIG. 10 is a schematic sectional view of an alternative embodiment of a gaseous fueled burner used in the BER according to the present invention.

A simplified burner option is also illustrated in FIG. 10 for a pressurized gas fuel supply. The gas would be supplied directly to the nozzle at a regulated pressure (approximately 3 to approximately 10 psig), eliminating the need for a liquid fuel catalytic vaporization chamber and a means to preheat it. The gas nozzle 124 could be very similar in design for this case.

Combustion Chamber Options

Figure 11:
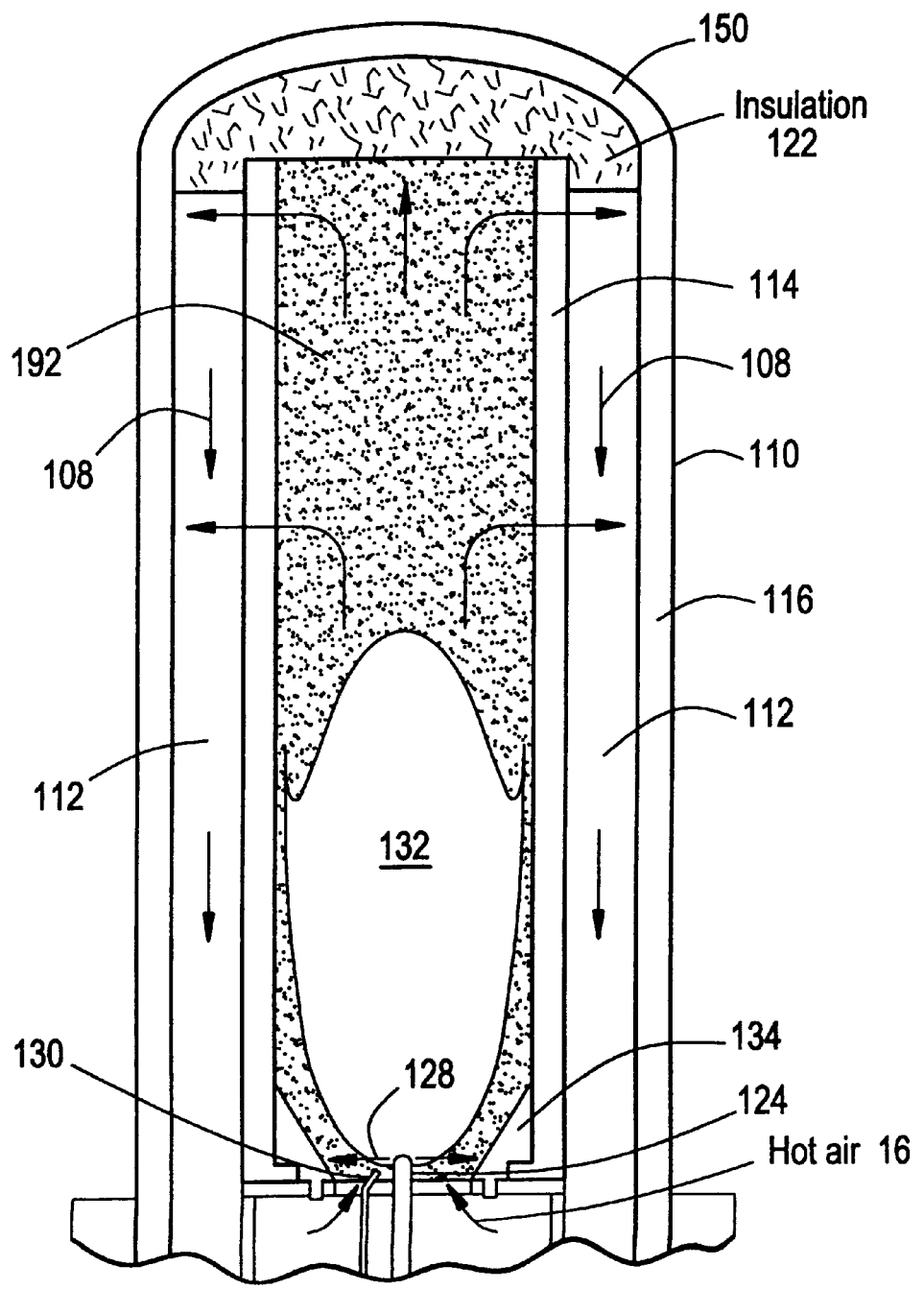
FIG. 11 is a schematic sectional view of an alternative embodiment of a combustion chamber used in the BER according to the present invention.
Figure 12:
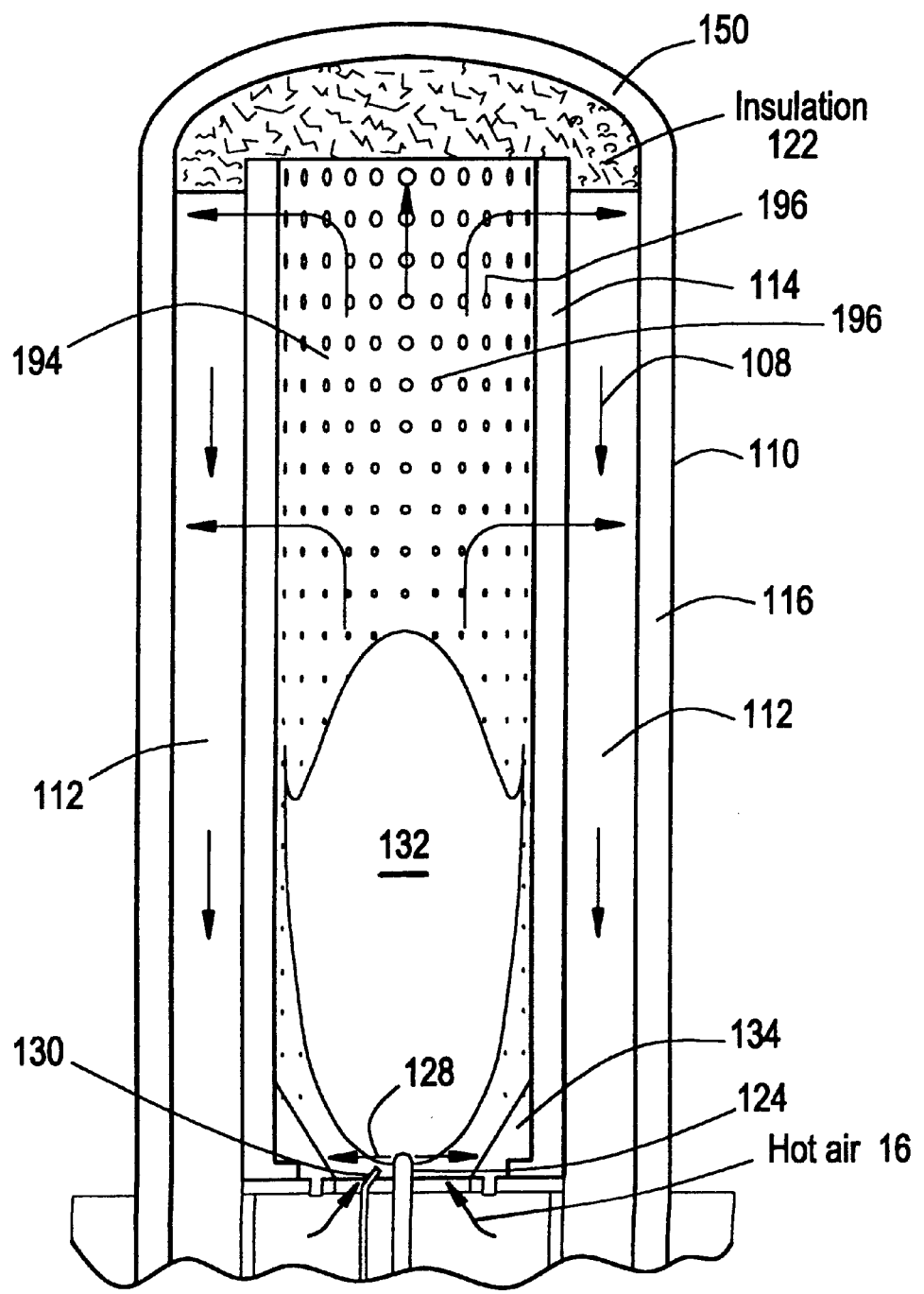
FIG. 12 is a schematic sectional view of another alternative embodiment of a combustion chamber used in the BER according to the present invention.

In the preferred embodiment of the radiant combustion chamber 104, the walls 114 are impervious to flow of combustion products therethrough. However, design alternatives for the radiant combustion chamber 104 modify or replace the inner tube 146 with flow-through materials. This includes porous media or reticulated ceramic combustion tubes or radiators 192 (FIG. 11), or a perforated inner tube 192 with a plurality of holes 194 as shown in FIG. 12. Improved heat coupling between the flame 132 and the flow through-surfaces 192, 194 should increase flow-through surface temperatures (relative to solid inner tube temperatures), and decrease combustion exit temperatures. Thus, improved fuel efficiency should result.

Options for flow-through components includes a porous matrix in a tubular shape or a tube with holes. Flow can be evenly distributed across the flow-through device by variation of porosity, thickness t of the inner tube 192, 196 with respect to tube height, and variation of 196 hole size diameter with respect to tube height. The even distribution of flow may be necessary to generate sufficiently uniform emitter temperatures.

The broadband emitter such as SiC is the primary choice for the emitter 110. Alternatively, selective or matched emitters may also be used. Selective emitters made with rare-earth oxides such as ytterbia, erbia, homia, neodymia can be used separately or in combination to produce radiation that is selective to the photovoltaic cell wave band. Typically, the use of selective emitters results in higher system efficiency but lower power density. Matched emitters are being developed which emit like a blackbody above the PV cell bandgap and are reflective below it. This is the best alternative for producing high efficiency and high power density.

Heat Exchanger Options

Figure 13:
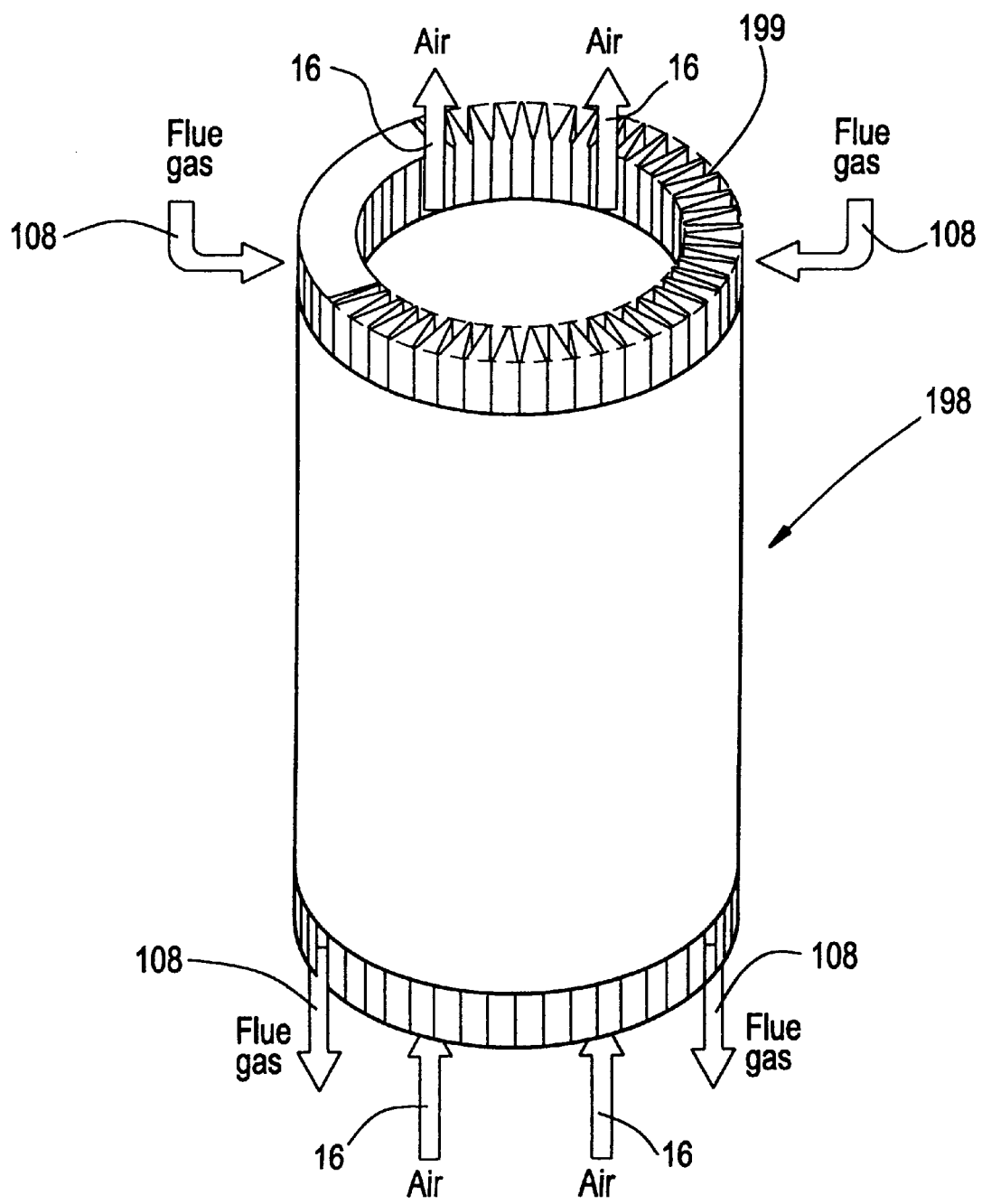
FIG. 13 is a schematic perspective view, partly in section, of another embodiment of a heat exchanger/recuperator used in the BER according to the present invention.

A second alternative design for the recuperator section 106 includes a compact alloy heat exchanger made of Kanthal® material with a fluted design, generally designated 198, and as illustrated in FIG. 13. Kanthal® material has a temperature limit of 1670° K. As with the first design, this approach gives the designer the option to trade off system efficiency versus weight in a compact low pressure drop design. The flutes 199 made of Kanthal® material in this fluted design have the additional advantages of being made from a single component with no fins to attach. Thus, in this embodiment, the counterflow recuperator section 106 comprises a compact fluted heat exchanger having a tube with fluting 199 on both its inside and outside surfaces, air 14 flowing in a first direction along the inside surface of the tube and hot combustion products 108 counterflowing along the outside surface of the tube in a second direction.

Accordingly, in some embodiments of the invention, certain features of the invention may sometimes be used to advantage without a corresponding use of the other features; likewise, some features may be combined to achieve a desired result. All such changes and embodiments thus properly fall within the scope and equivalents of the following claims.

We claim:

1. A thermally integrated burner/emitter/recuperator (BER) for a thermophotovoltaic (TPV) electric generator, comprising:

radiant combustion chamber means having an inlet for admission of air and fuel and an outlet for exhaust of hot combustion products;

burner means for providing air and liquid fuel to the inlet of the radiant combustion chamber means for combustion therein;

counterflow recuperator means, located adjacent to the burner means, for preheating the air with the hot combustion products exhausted from the radiant combustion chamber means;

parallel flow fuel vaporizer/recuperator means located within the counterflow recuperator means, for vaporizing the fuel with the preheated combustion air prior to providing same to the burner means; and emitter means for radiating photons when heated by the radiant combustion chamber means and the hot combustion products, the emitter means surrounding and cooperating with the radiant combustion chamber means and the counterflow recuperator means so as to convey the hot combustion products along a wall of the emitter to heat it as the hot combustion products are conveyed from the outlet of the radiant combustion chamber means to the counterflow recuperator means.

2. The thermally integrated BER according to claim 1, wherein the radiant combustion chamber means, the burner means, the counterflow recuperator means, the parallel flow fuel vaporizer/recuperator means, and the emitter means are substantially coaxial with one another.

3. The thermally integrated BER according to claim 1, wherein the counterflow recuperator means, the radiant combustion chamber means, and the surrounding emitter means are arranged so that air flows through the counterflow recuperator means and combustion products flow through the radiant combustion chamber means predominantly in a first direction, while hot combustion products counterflow along the wall of the emitter from the outlet of the radiant combustion chamber means to the counterflow recuperator means predominantly in a second direction.

4. The thermally integrated BER according to claim 1, wherein the burner means comprises a gas nozzle positioned within a frustoconical burner throat quarl located at the inlet to the radiant combustion chamber means.

5. The thermally integrated BER according to claim 4, wherein the gas nozzle and the frustoconical burner throat quarl cooperate to produce an annular burner air opening for admission of air into the radiant combustion chamber means.

6. The thermally integrated BER according to claim 4, wherein the gas nozzle is designed to inject the fuel into the radiant combustion chamber means substantially radially, and with a tangential velocity component and a small axial velocity component, in the vicinity of the frustoconical burner throat.

7. The thermally integrated BER according to claim 4, wherein the frustoconical burner throat quarl has an angle within a range of approximately 15° to approximately 45° from a central axis of the quarl.

8. The thermally integrated BER according to claim 4, wherein the frustoconical burner throat quarl comprises means for securing itself, the radiant combustion chamber means, and the counterflow recuperator means together as an assembly.

9. The thermally integrated BER according to claim 8, wherein the counterflow recuperator means includes an upper recuperator plate having a plurality of slots and the securing means comprises a corresponding plurality of L-shaped pins embedded into the frustoconical burner throat quarl which intercooperate with the slots to hold the frustoconical burner throat quarl, the radiant combustion chamber means, and the counterflow recuperator means together as an assembly.

10. The thermally integrated BER according to claim 1, wherein walls of the radiant combustion chamber means are impervious to flow of combustion products therethrough.

11. The thermally integrated BER according to claim 1, wherein walls of the radiant combustion chamber means comprise one of porous media, reticulated ceramics, or perforations in the walls which permit flow of combustion products therethrough.

12. The thermally integrated BER according to claim 1, wherein the emitter means is a one-piece construction with a closed end, and walls of the emitter means are impervious to flow of combustion products therethrough.

13. The thermally integrated BER according to claim 1, wherein the fuel vaporizer means further comprises electrical resistance heating means.

14. The thermally integrated BER according to claim 1, further comprising catalytic fuel vaporizer means, located within the counterflow recuperator means, for vaporizing liquid fuel and forming light saturated and unsaturated hydrocarbon fractions and hydrogen prior to supplying same to the burner means.

15. The thermally integrated BER according to claim 14, further comprising pilot flame means for vaporizing liquid fuel prior to supplying same to the burner means.

16. The thermally integrated BER according to claim 1, wherein the counterflow recuperator means comprises a compact plate fin heat exchanger having a tube finned on both its inside and outside surfaces, air flowing in a first direction along the inside surface of the tube and hot combustion products counterflowing along the outside surface of the tube in a second direction.

17. The thermally integrated BER according to claim 1, wherein the counterflow recuperator means comprises a compact fluted heat exchanger having a tube with fluting on both its inside and outside surfaces, air flowing in a first direction along the inside surface of the tube and hot combustion products counterflowing along the outside surface of the tube in a second direction.

18. The thermally integrated BER according to claim 1, wherein the combustion chamber means has a wall thickness t selected to obtain a substantially uniform emitter temperature profile along an active length of the emitter means when the BER is being fired with fuel and air and is operating at steady state conditions.

19. The thermally integrated BER according to claim 1, wherein the hot combustion products conveyed along the wall of the emitter means flow through a passageway defined inbetween the wall of the emitter means and the radiant combustion chamber means and the counterflow recuperator means having a width w selected to obtain a substantially uniform emitter temperature profile along an active length of the emitter means when the BER is being fired with fuel and air and is operating at steady state conditions.

20. The thermally integrated BER according to claim 6, wherein characteristics of a flame produced by the gas nozzle are selected to obtain a substantially uniform emitter temperature profile along an active length of the emitter means when the BER is being fired with fuel and air and is operating at steady state conditions.

\* \* \* \* \*